United States Patent
Broderick et al.

(10) Patent No.: US 7,155,099 B2
(45) Date of Patent: Dec. 26, 2006

(54) HOLEY OPTICAL FIBRES OF NON-SILICA BASED GLASS

(75) Inventors: Neil Gregory Raphael Broderick, Southampton (GB); Daniel William Hewak, Southampton (GB); Tanya Mary Monro, Southampton (GB); David John Richardson, Southampton (GB); Yvonne Deana West, Southampton (GB)

(73) Assignee: University of Southampton, Southampton (GB)

( * ) Notice: Subject to any disclaimer, the term of this patent is extended or adjusted under 35 U.S.C. 154(b) by 88 days.

(21) Appl. No.: 10/344,685

(22) PCT Filed: Aug. 13, 2001

(86) PCT No.: PCT/GB01/03610

§ 371 (c)(1),
(2), (4) Date: Feb. 14, 2003

(87) PCT Pub. No.: WO02/14946

PCT Pub. Date: Feb. 21, 2002

(65) Prior Publication Data

US 2003/0161599 A1  Aug. 28, 2003

(30) Foreign Application Priority Data

Aug. 14, 2000  (GB) .................................. 0019974.5

(51) Int. Cl.
*G02B 6/20* (2006.01)
(52) U.S. Cl. .......................... 385/125; 385/128; 65/393
(58) Field of Classification Search ........ 385/122–128; 65/385, 393, 427–435, 439, 475
See application file for complete search history.

(56) References Cited

U.S. PATENT DOCUMENTS 4,410,344 A * 10/1983 Iyengar ........................ 65/382

(Continued)

FOREIGN PATENT DOCUMENTS

EP   0 060 085   9/1982

(Continued)

OTHER PUBLICATIONS

Monroe et al., "Chalcogenide holey fibre." *Electronics Letters.* 36.24 (2000).

(Continued)

*Primary Examiner*—Kevin S. Wood
(74) *Attorney, Agent, or Firm*—Renner, Otto, Boisselle & Sklar, LLP (57) ABSTRACT

To overcome problems of fabricating conventional core-clad optical fibre from non-silica based (compound) glass, it is proposed to fabricate non-silica based (compound) glass optical fibre as holey fibre i.e. one contining Longitudinal holes in the cladding. This removes the conventional problems associated with mismatch of the physical properties of the core and clad compound glasses, since a holey fibre can be made of a single glass composition. With a holey fibre, it is not necessary to have different glasses for the core and cladding, since the necessary refractive index modulation between core and cladding is provided by the microstructure of the clad, i.e. its holes, rather than by a difference in materials properties between the clad and core glasses. Specifically, the conventional thermal mismatch problems between core and clad are circumvented. A variety of fibre types can be fabricated from non-silica based (compounds) glasses, for example: single-mode fibre; photonic band gap fibre; highly non-linear fibre; fibre with photosensitivity written gratings and other refractive index profile structures; and rare-earth doped fibres (e.g. Er, Nd, Pr) to provide gain media for fibre amplifiers and lasers.

11 Claims, 11 Drawing Sheets

U.S. PATENT DOCUMENTS

| | | | |
|---|---|---|---|
| 4,764,194 A * | 8/1988 | Maklad | 65/393 |
| 5,026,142 A | 6/1991 | Worrell et al. | |
| 5,093,287 A | 3/1992 | Borrelli et al. | |
| 5,802,236 A | 9/1998 | DiGiovanni et al. | |
| 5,822,479 A | 10/1998 | Napier et al. | |

FOREIGN PATENT DOCUMENTS

| | | |
|---|---|---|
| EP | 0 249 886 | 12/1987 |
| EP | 0 810 453 | 12/1997 |
| EP | 0 843 186 | 5/1998 |
| WO | 98/08120 | 2/1998 |
| WO | 99/00685 | 1/1999 |
| WO | 00/16141 | 3/2000 |
| WO | 00/49436 | 8/2000 |
| WO | 00/60388 | 10/2000 |

OTHER PUBLICATIONS

Database Inspec 'Online! "A robust, large air fill fraction holey fibre." *The Institution of Electrical Engineers.* Inspec No. 65123600, 1999.

Hewak, Daniel et al. "Photonic Applications of Sulphide Glass Optical Fibres." *11th International Conference on Integrated Optics and Optical Fibre Communications.* IEE Conference Publication, 1.448 (1997):65-66.

Monro, Tanya et al. "Holey Optical Fibers: An Efficient Modal Model." *Journal of Lightwave Technology.* 17.6 (1999):1093-1102.

West, Y.D. et al. "Gallium Lanthanum Sulphide Fibers for Infrared Transmission." *Fiber and Integrated Optics.* 19 (2000):299-250.

Birks, T.A. et al. "Four-port fiber frequency shifter with a null taper coupler." *Optics Letters.* 19.23 (1994):1964-1967.

Yun, Seok Hyun et al. "All-fiber Acoustooptic Filter with Low-Polarization Sensitivity and No Frequency Shift." *IEEE Photonics Technology Letters.* 9.4 (1997): 461-463.

* cited by examiner

HOLEY OPTICAL FIBRES OF NON-SILICA BASED GLASS

This application is a 371 of PCT/GB01/03610 filed Aug. 13, 2001 and published in the English language under International Publication No. WO 02/14946 A1.

BACKGROUND OF THE INVENTION

The invention relates to optical fibres made of compound glass, to methods of making such optical fibres, and to devices comprising compound glass optical fibres.

Compound glasses have several important properties that cannot be obtained with conventional silicate glasses, e.g. silica, germanosilicate and borosilicate glass, which makes them attractive as alternative materials for optical fibres. Compound, glasses with properties of interest include:

Chalcogenides (e.g. S, Se or Te—based glasses);
Sulphides (e.g. Ge:S, Ga:La:S, As:S, Ge:Ga:S, Ge:Ga:La:S);
Oxy Sulphides (e.g. Ga:La:O:S);
Halides (e.g. ZBLAN (trade mark), ALF);
Chalcohalides (e.g. Sb:S:Br); and
Heavy Metal Oxides (e.g. PbO, ZnO, $TeO_2$).

Further details of compound glasses can be found in the literature [1]. One compound glass of specific interest is the sulphide glass Ga:La:S, i.e. gallium lanthanum sulphide (GLS), which can transmit in the infrared, has a high refractive index, has a high optical non-linearity and can be doped with over 10% rare earth ions by weight [2]. However, despite the potential of these compound glass materials for optical fibres, their exploitation has been held back by the fact that they are difficult to fabricate to the necessary quality.

Low-loss single-mode compound glass optical fibres are difficult to fabricate, because of the inherent physical and mechanical properties of compound glasses. In particular, to provide the necessary refractive index difference between the core and the clad glasses, changes in the glass composition need to be made. However, different compositions also have different physical behaviour, such as thermal expansion coefficient, glass transition temperature $T_g$ and crystallisation temperature $T_x$ which have to be taken account of in the fabrication process. In particular, the thermal mismatch between the core and clad glasses must be kept to a minimum and needs to be accommodated by the preform design. It is not straightforward to produce small core preforms in a single step.

Another problem that makes it more difficult to make optical fibres from compound glasses rather than silica glasses, is that the temperature window available for preform fabrication and fibre drawing is much smaller. Fabrication of single mode fibre generally requires several heating steps to prepare a precursor preform of suitable geometry. However, the multiple heating steps cycle the temperature, which promotes nucleation site formation at the surfaces of the glass. Nucleation sites lead to crystallisation and result in the final optical fibre being lossy. This is a principal reason for the relatively high transmission losses of current compound glass fibres, e.g. fluoride and sulphide glass optical fibres. It is known that low-loss optical fibres can only be achieved if there is a pristine core-clad interface. Methods such as rotational casting and extrusion can be employed to provide good core-clad interface quality, but are difficult to perform successfully.

In summary, although compound glass fibres are recognised as being desirable in principle, it has not hitherto been possible to fabricate compound glass fibres of sufficient quality to allow widespread device and transmission applications to be realised.

SUMMARY OF THE INVENTION

According to the invention there is provided a compound glass optical fibre comprising a holey cladding. By providing a holey cladding, the problems associated with mismatch of the physical properties of the core and clad compound glasses do not arise, since the optical fibre can be made of a single compound glass. With a holey fibre, it is not necessary to have different compound glasses for the core and clad, since the necessary refractive index modulation between core and clad is provided by the microstructure of the cladding, i.e. its holes, rather than by a difference in materials' properties between the clad and core glasses. Specifically, the conventional thermal mismatch problems between core and clad are circumvented which, in turn, allows the number of heating steps in the fabrication process to a minimum, i.e. two, one for preform fabrication and another for drawing the fibre. Consequently, the potential for nucleation and crystallisation problems is kept to a minimum.

The experimental work done to date on holey optical fibres has concentrated exclusively on conventional silica glasses. Some general background on conventional holey fibres can be found in references [3] and [4]. In the prior art, moving from fabrication of a conventional fibre to a holey fibre is considered to be adding a further level of complication to the fabrication process. While this is true for conventional silica fibres where fabrication procedures are under good control, the present inventors have appreciated that it is not universally true for all glasses. In particular, it is not true for compound glasses where it is in fact simpler to fabricate good quality holey fibres than conventional fibres, for the reasons already described.

The invention can be exploited to develop a variety of fibre types from compound glasses, for example: single-mode fibre, photonic band gap fibre, highly non-linear fibre, fibre with photosensitively written gratings and other refractive index profile structures, and rare-earth doped fibres (e.g. Er, Nd, Pr) to provide gain media for fibre amplifiers and lasers.

The invention can also be exploited to develop a variety of active and passive devices from compound glasses, for example: optical switches, dispersion compensators, 1.3 micron rare-earth doped fibre amplifiers, and a variety of infrared devices in the wavelength range 1–10 microns.

The invention provides in another aspect a method of fabricating compound glass fibre, comprising: (a) making a holey preform of compound glass; and (b) drawing the preform in a drawing tower to produce a fibre.

The holey preform is preferably made by stacking together a plurality of compound glass tubes. The tubes are advantageously stacked within a larger tube that forms an outer jacket. The outer jacket may be coated prior to drawing with a material for stripping cladding modes and/or providing mechanical strength, for example graphite which provides both these functions.

In an embodiment, the holey preform is supported by a wiring structure retained for the drawing. A plug is preferably arranged at a bottom end of the preform to prevent the compound glass tubes from falling out. The plug may conveniently be held in place by the wiring structure.

For drawing the fibre, the drawing tower preferably has a hot zone of at least 2 cm in length, typically 2–10 cm in length, with a length of 5 cm being used in a specific example for fabricating GLS holey fibre. The drawing temperature is less than 1800° C., i.e. lower than for silica glasses. In fact, conventional silica glass fibre drawing equipment and experimental parameters cannot be used for these glasses.

BRIEF DESCRIPTION OF THE DRAWINGS

For a better understanding of the invention and to show how the same may be carried into effect reference is now made by way of example to the accompanying drawings in which.

DETAILED DESCRIPTION

I. Results

Figure 1A:
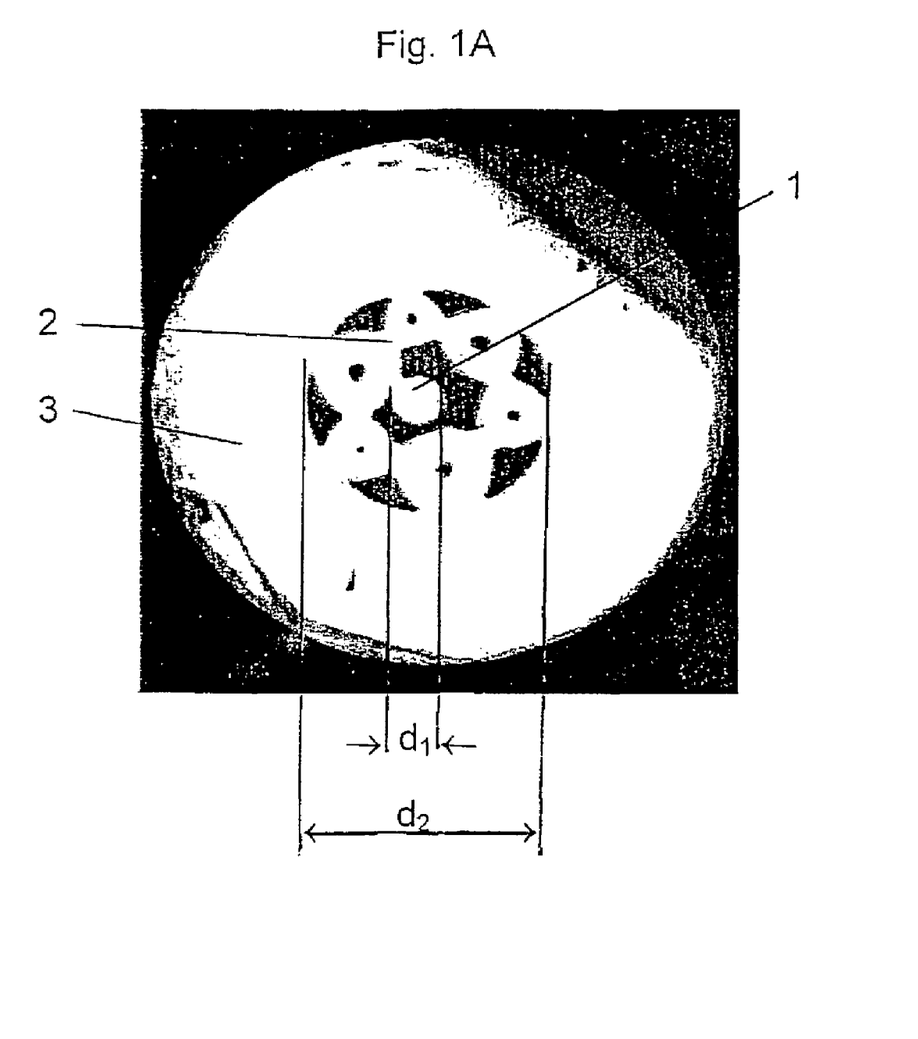
FIG. 1A shows a cross-section of a GLS holey fibre of approximate outer diameter 100 microns.
Figure 1B:
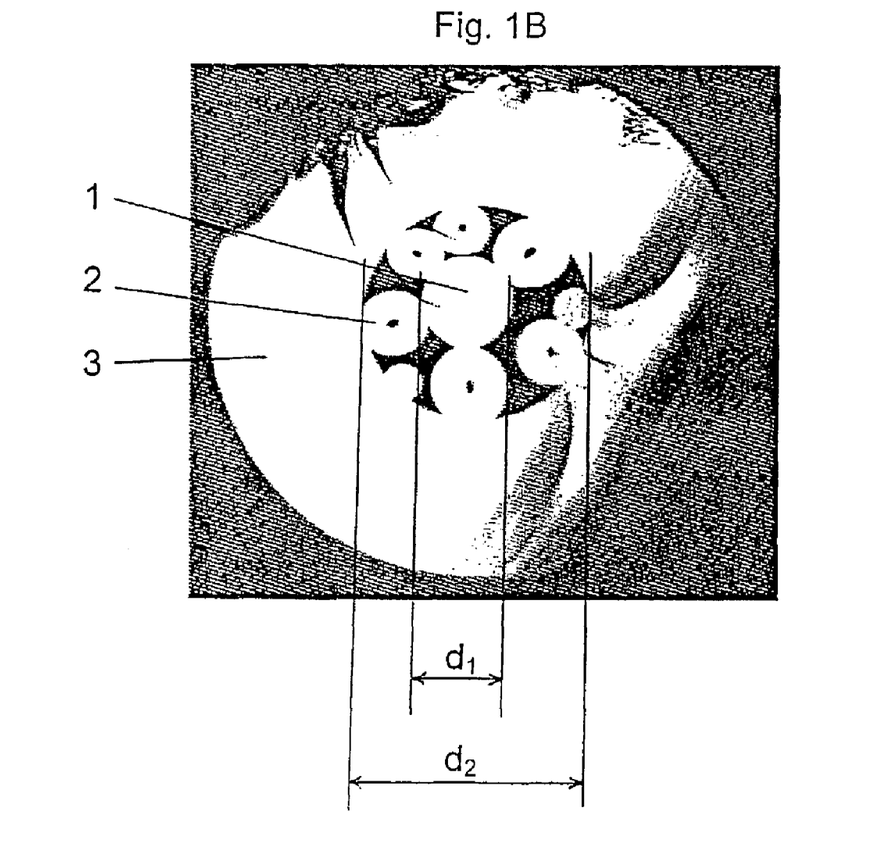
FIG. 1B shows a cross-section of a GLS holey fibre of approximate outer diameter 180 microns.

FIGS. 1A and 1B are photographs of the cross-sections of two different holey fibres fabricated from GLS glass.

In each case, the GLS holey fibre has a microstructured transverse refractive index profile defined by the holes (dark in the photographs) that run along the length of the fibre (perpendicular to the plane of the photographs).

In each of FIGS. 1A and 1B, the fibre comprises a solid core 1 of diameter $d_1$ surrounded by a holey cladding 2 of diameter $d_2$ formed from tubular glass structures. The fibre further comprises a solid jacket 3 surrounding the cladding. In each example, good structure retention was obtained after pulling the fibre using a specialised and custom designed, fibre drawing tower and a specially constructed GLS preform, which are described in detail further below.

II. Fabrication

The special procedures used for fabricating holey fibres in compound glass materials are now described. The compound glasses are initially formed by following conventional melting techniques. Fabrication of the fibre involves two main stages, namely preform fabrication followed by fibre drawing.

Preform fabrication is performed by the steps of tube fabrication, stacking and wiring which are now described in more detail.

The tubes, which ultimately form the holey parts of the fibre, can be made in a variety of ways. Typically, the starting point for the tubes is a large-scale tube of ~1 cm outer diameter (OD). The large-scale tube can be produced by: extrusion, milling and drilling, polishing, piercing, spin/rotational casting, other casting methods (e.g. built-in casting), compression moulding, direct bonding etc. The tubes are then caned down using a fibre draw tower to the dimensions required for the preform assembly (~0.5–3 mm OD).

A number of the pre-fabricated caned-down tubes are then stacked together within a larger tube, which acts as a support and a protective outer jacket for the preform. A solid element such as a rod is used to form the core of the fibre.

After stacking, the preform is wired at both its top and bottom ends. The wiring at the top of the preform allows it to be suspended in the furnace, and minimises the quantity of glass required for the preform. The wiring at the bottom allows a weight to be used in the fibre drawing and helps maintain the tube structure during the draw (see below). It is beneficial to insert a plug at the bottom of the preform to prevent the fine tubes from falling out the bottom of the preform during the fibre drawing. This plug is also fixed in place by the wiring.

Figure 2A:
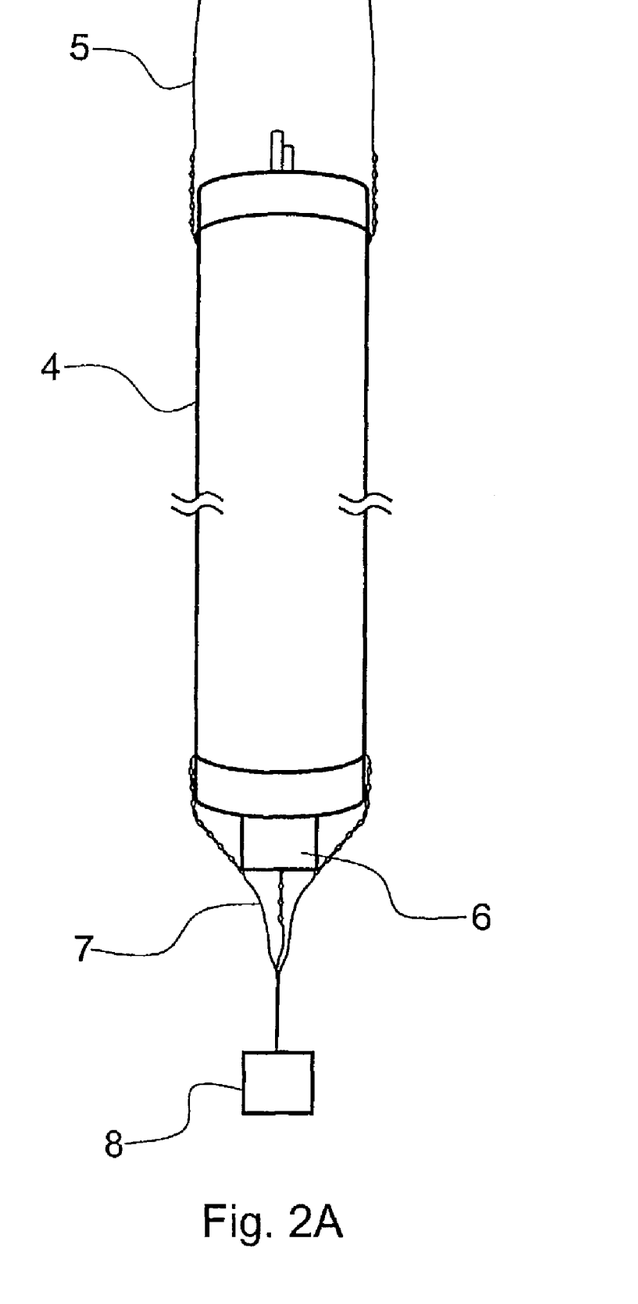
FIG. 2A shows an assembled holey fibre preform and its wiring structure ready for fibre drawing.

FIG. 2A shows the assembled holey fibre preform immediately prior to fibre drawing. Evident in this figure are the above-mentioned features of the outer jacket 4, the plug 6, the wiring structure made up of upper and lower parts 5 and 7 and the weight 8 used to assist the drawing. In this example, the preform has a length of 100 mm and a diameter of 10 mm. However, there is wide scope to vary the size of the preform. Some of the internal structure is also evident extending from the top end of the outer casing.

Other methods of preform manufacture and assembly are also possible. For example, one alternative to the above preform fabrication method is to drill and mill the required preform profile out of a single solid piece of compound glass. Alternatively, rather than tubes, other geometries of internal structure could be employed.

The completed preform is then ready for the next main stage of drawing. For drawing, the preform is placed in a fibre drawing tower. Fibre drawing is performed by the controlled heating and/or cooling of the compound glass through a viscosity range of around $10^6$ poise. It is useful to monitor the diameter and tension of the fibre as it is being drawn and use the data thus acquired in an automatic feedback loop to control the preform feed speed, the fibre draw speed and/or other parameters related to the furnace in order to yield a uniform fibre diameter.

A principal component of the drawing tower used to pull the preform into fibre is a heat source, which may be a graphite resistance heater or a radio-frequency furnace. The use of an RF source is preferred for the precise temperature control it provides. The role of the furnace is to heat the compound glass preform of FIG. 2A prior to drawing into a fibre.

It is critical to control the fibre drawing temperature, and hence the glass viscosity, so that two criteria are met. First, the fibre drawing temperature must soften the glass to provide a viscosity for which the glass can deform and stretch into a fibre without crystallisation. Second, the softening of the glass must not be so great that the crucial internal structure, i.e. the holes, collapse and flow together.

Figure 2B:
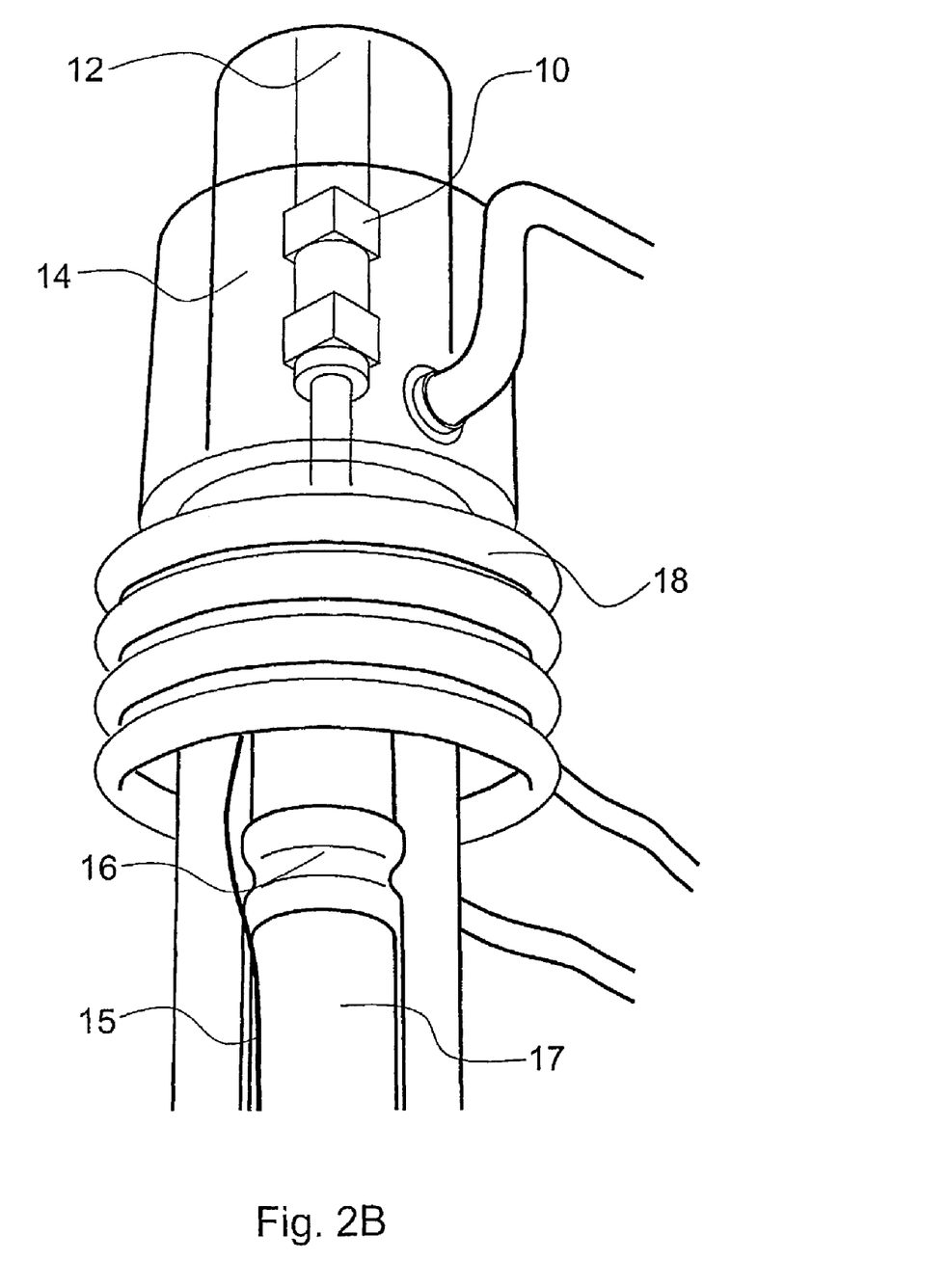
FIG. 2B shows a fibre drawing furnace forming part of a drawing tower for drawing compound glass holey fibres.

FIG. 2B shows the custom RF furnace used to draw the GLS holey fibres shown in FIGS. 1A and 1B which has been designed to satisfy these two criteria. The furnace incorporates an inductively heated (RF) hot zone defined by water-cooled helically wound RF coils 18. In use, the water cooled RF coils generate an RF field that heats a graphite susceptor (not visible). In the illustrated furnace, the RF coils define a 50 mm long hot zone around and along the preform. In general, it is recommended that, for drawing compound glass holey fibres, the furnace provides a hot zone having a length of at least 2 cm. (In comparison, a conventional silica drawing tower typically has a hot zone of about 1 cm in length). The drawing temperature is less than 1800° C. and considerably lower than for silica glass.

A combination of water and gas cooling is provided above and below the hot zone. The cooling keeps the compound glass outside the hot zone cooled to below its crystallisation temperature. Elements of the cooling system are apparent from the figure, namely an upper gas halo 12, a lower gas halo 16, a cold finger 17, and a water jacket 14 made of silica. The upper gas halo and silica water jacket cool the preform prior to entry into the hot zone. The cold finger, and lower gas halo provide rapid cooling after the fibre emerges from the hot zone. A chuck 10 used to suspend the preform from its upper wiring structure is also indicated. A thermocouple 15 for monitoring furnace temperature is also indicated. The thermocouple forms part of a control system for regulating the furnace temperature.

The fibre is typically pulled under high tension by using weights that are attached to the above-described lower wiring structure. Typically more than 100 g weight-is used, more especially a weight of between 100 g and 200 g. This allows the fibre to begin to drop without unnecessary glass wastage and at a lower temperature which minimises crystallisation.

The top ends of the tubes can beneficially be fixed in the preform to prevent them sagging during pulling. This can be done with the wiring at the preform stage or alternatively during drawing by pre-fusing the top of the preform prior to pulling.

A range of different coating materials can be used for coating the outside of the preform prior to or during drawing. Examples of coating materials are standard acrylates, resin, teflon, silicone rubber, epoxy or graphite. In particular, graphite coating can be used to good effect since it promotes stripping of cladding modes and also provides enhanced mechanical strength.

Although the embodiment uses tubes as a basis for the holey fibre preform, it will be understood that other shapes could be used to provide the preform. It is sufficient that the assembled preform has a sufficient number of gaps or cavities surrounding the solid core region. It will also be understood that the hole arrangement need not be periodic unless the fibre is intended to have photonic crystal effects.

Although FIG. 1 relates to the compound glass GLS, further embodiments of the invention relate to holey fibre made from the following compound glasses:
  Chalcogenides (e.g. S, Se or Te—based glasses);
  Sulphides (e.g. Ge:S, As:S, Ge:Ga:S, Ge:Ga:La:S);
  Oxy Sulphides (e.g. Ga:La:O:S);
  Halides (e.g. ZBLAN (trade mark), ALF);
  Chalcohalides (e.g. Sb:S:Br); and
  Heavy Metal Oxides (e.g. PbO, ZnO, $TeO_2$).

Some specific examples are now further detailed.

In the case of a sulphide glass, this may be formed from the sulphides of metals selected from the group: sodium, aluminium, potassium, calcium, gallium, germanium, arsenic, selenium, strontium, yttrium, antimony, indium, zinc, barium, lanthanum, tellurium and tin.

In the case of a glass based on gallium sulphide and lanthanum sulphide, glass modifiers may be used based on at least one of: oxides, halides or sulphides of metals selected from the group: sodium, aluminium, potassium, calcium, gallium, germanium, arsenic, selenium, strontium, yttrium, antimony, indium, zinc, barium, lanthanum, tellurium and tin.

In the case of a halide glass, it may be formed from fluorides of at least one of: zirconium, barium and lanthanum. Further, glass modifiers may be used selected from the fluorides of the group: sodium, aluminium, potassium, calcium, gallium, germanium, arsenic, selenium, strontium, yttrium, antimony, indium, zinc, barium, lanthanum, tellurium and tin.

In the case of a heavy metal oxide glass, the oxides may be selected from: sodium, aluminium, potassium, calcium, gallium, germanium, arsenic, selenium, strontium, yttrium, antimony, indium, zinc, barium, lanthanum, tellurium and tin.

In the case of a heavy metal oxyfluoride glass, the glass may be formed by heavy metal oxides selected from oxides of metals of the group: sodium, aluminium, potassium, calcium, gallium, germanium, arsenic, selenium, strontium, yttrium, antimony, indium, zinc, barium, lanthanum, tellurium and tin and 0–50 mol % total fluoride.

In the case of a heavy metal oxychloride glass, the glass may be formed by heavy metal oxides selected from oxides of metals from the group: sodium, aluminium, potassium, calcium, gallium, germanium, arsenic, selenium, strontium, yttrium, antimony, indium, zinc, barium, lanthanum, tellurium and tin and 0–50 mol % total chloride.

In the case of a heavy metal oxybromide glass, the glass may be formed by heavy metal oxides selected from oxides of metals from the group: sodium, aluminium, potassium, calcium, gallium, germanium, arsenic, selenium, strontium, yttrium, antimony, indium, zinc, barium, lanthanum, tellurium and tin and 0–50 mol % total bromide.

In general the compound glass may or may not include silica. If silica is present the glass may include up to one of: 30, 40, 50, 60 and 70 mol % of silica. However, in many cases, the compound glass will be substantially free of silica, containing less than one of: 0.1, 1 and 5 mol % of silica.

Still further embodiments relate to holey fibres made of compound glasses referred to in reference [1] the contents of which are incorporated herein by reference.

III. Applications

1. Passive Devices (a) Single Mode Optical Fibres in GLS and Other Compound Glasses: As described above, by adopting the holey fibre approach, single mode compound glass fibre is easier to fabricate than a conventional solid fibre.

(b) Optical Fibre for Long Wavelengths (eg. 1–10 microns): Use can be made of the low absorption in the infrared that is typical of many compound glass materials. In particular, many compound glasses are transparent in the 3–5 micron atmospheric transmission window (including CO absorption and emission wavelengths). Some compound glasses are transparent from 9–11 microns (including $CO_2$ laser wavelengths).

Figure 3:
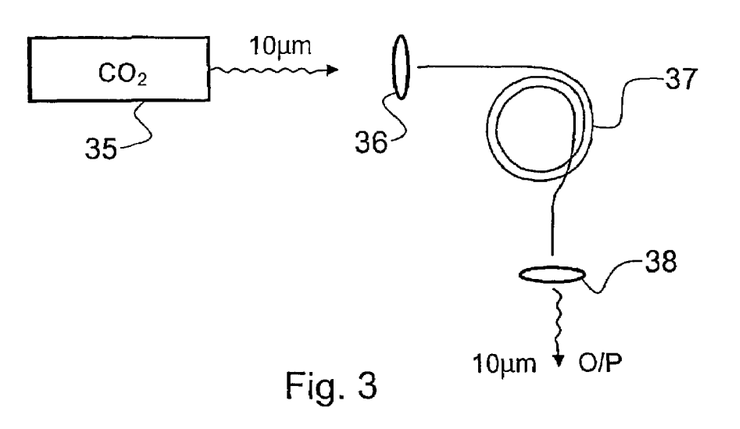
FIG. 3 shows a compound glass holey fibre used for delivering an infrared laser output beam.

FIG. 3 shows use of a compound glass holey fibre for high power transfer of output from a $CO_2$ laser 35 which may be used for machining, aerospace or sensor applications. The laser output beam at 10 microns wavelength is coupled into and out of a compound glass holey fibre 37 with suitable lenses 36 and 38.

Figure 4A:
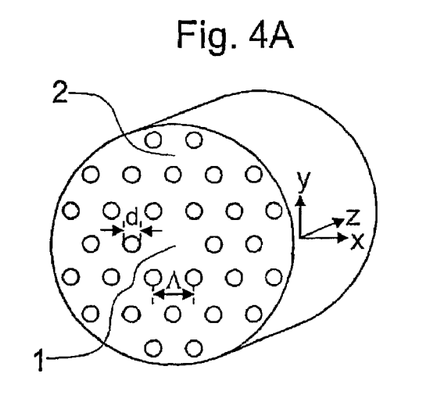
FIG. 4A is a cross-section of a solid core single-mode holey fibre.

(c) Single mode waveguide operating over extended range from the visible to infrared: FIG. 4A shows in section a compound glass single-mode holey fibre comprising a solid core 1 and holey cladding 2. An outer jacket (not shown) may also be provided. The holes in the cladding are separated by a characteristic hole-to-hole spacing ($\Lambda$) which may be in the range from 1 to 100 microns. The solid core 1 will typically be fabricated from a solid rod placed centrally in the preform stack, surrounded by hollow tubes or capillaries which form the holes in the cladding of the fabricated fibre. Although a periodic hole arrangement is shown in the figure, this is not essential. Indeed these holes can even be randomly arranged. For single-mode operation over a range of wavelengths, it is preferable that the condition $d/\Lambda<0.2$ is satisfied, where d is an average hole diameter and $\Lambda$ the average inter-hole spacing mentioned above. It is envisaged that the method of guiding light along the compound glass optical fibre of this example is by average refractive index effects, rather than photonic crystal effects.

Figure 4B:
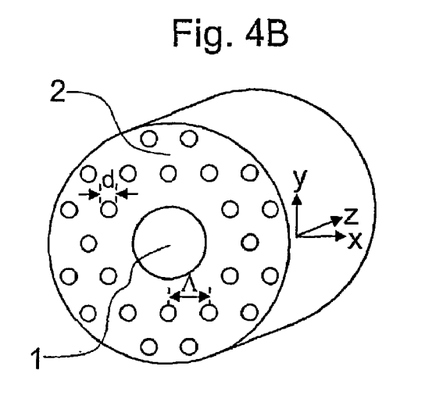
FIG. 4B is a cross-section of a hollow core photonic crystal holey fibre.

(d) Photonic Band Gap Fibres: FIG. 4B shows an example of a photonic band gap compound glass holey fibre comprising a hollow, i.e. holey, core 1 and a holey cladding 2. Compound glasses typically have a significantly higher refractive index than silica ($n\approx2.5$). This increases the refractive index contrast possible between the glass and air. In turn, this will male it easier to fabricate compound glass holey fibres with photonic band gaps, in comparison to silica glass holey fibres. For example, in silica, very large air holes are needed in order to guide using photonic band gap effects, whereas smaller holes could be used in a higher contrast structure. In addition, it is likely that the stronger band gaps possible in a high contrast structure will allow band gaps to be formed using a smaller number of air holes.

Figure 5:
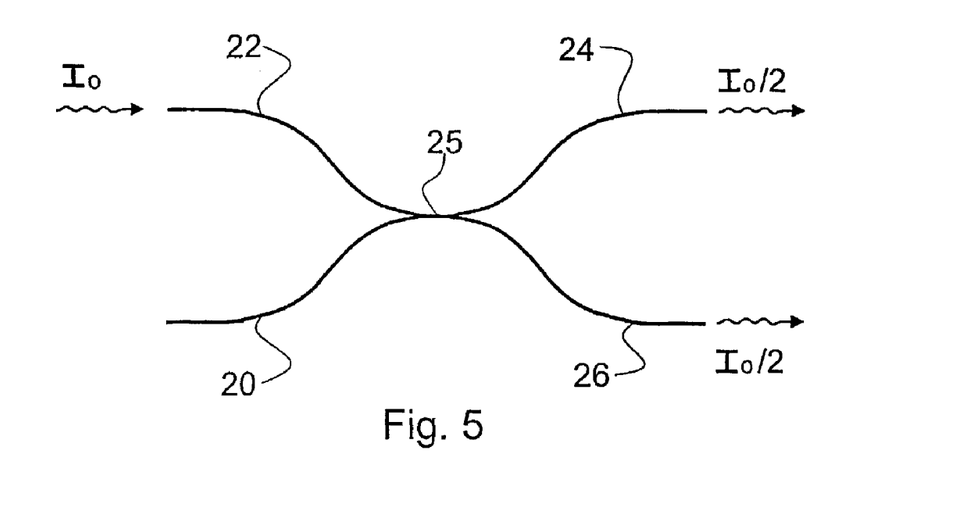
FIG. 5 shows a fused-taper 50:50 coupler made of compound glass holey fibre.

(e) Couplers Splitters etc: In principle, compound glass holey fibres could allow the full range of fibre components to be extended to the infrared. An exemplary 50:50 fused coupler is shown in FIG. 5. A fused region 25 interconnects arms 20, 22, 24 and 26, with an input light beam of intensity $I_0$ being split into two beams of half intensity $I_0/2$.

Figure 6:
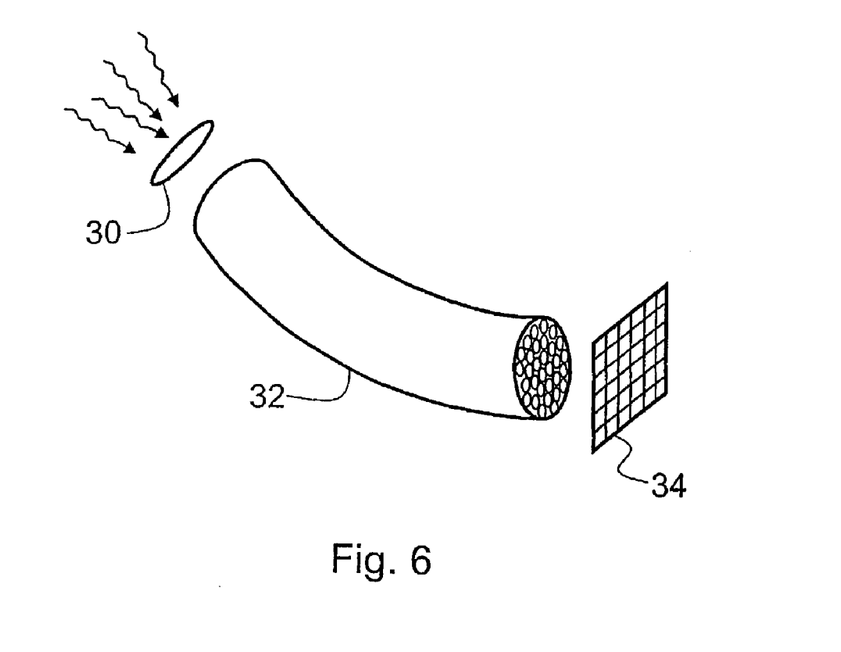
FIG. 6 shows a compound glass holey fibre bundle used for array detector imaging.

(f) Infrared Thermal Imaging: Compound glass holey fibres could be used in a range of thermal imaging applications. FIG. 6 shows a compound glass holey fibre bundle 32 used to channel light from an imaging lens 30 to a detector array 34 which will be connected to image processing electronics (not shown).

Figure 7:
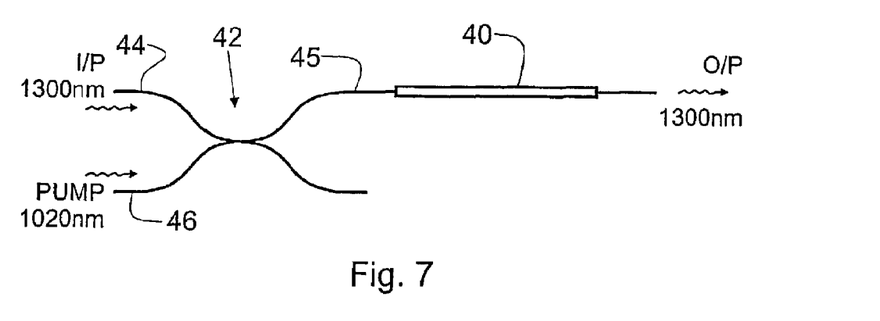
FIG. 7 shows a 1300 nm fibre amplifier based on a Pr:doped GLS holey fibre.

2. Active Devices (a) 1300 nm Optical Amplifier: FIG. 7 shows a 1300 nm band rare-earth doped holey GLS holey fibre amplifier. Pump radiation at 1020 nm from a laser diode and a 1300 nm input signal are supplied to fused coupler input arms 44 and 46, and mixed in a fused region 42 of the coupler. A portion of the mixed pump and signal light is supplied by an output arm 45 of the coupler to a section of $Pr^{3+}$-doped GLS holey fibre 40 where it is amplified and output. Other rare-earth dopants such as Nd or Dy could also be used with an appropriate choice of pump wavelength.

(b) Infrared Fibre Laser: With compound glasses, a new range laser transitions become efficient and viable, so compound glass holey fibres have potential for use as gain media in laser sources. Some examples include using lines at 3.6 and 4.5 microns (Er), 5.1 microns ($Nd^{3+}$), 3.4 microns ($Pr^{3+}$), 4.3 microns ($Dy^{3+}$), etc. More examples for GLS are given in reference [2] which is incorporated herein by reference. These transitions could be exploited in a range of lasers, including continuous wave, Q-switched, and mode-locked lasers. In addition, any of the usual rare-earth dopants could be considered depending on the wavelengths desired.

Figure 8:
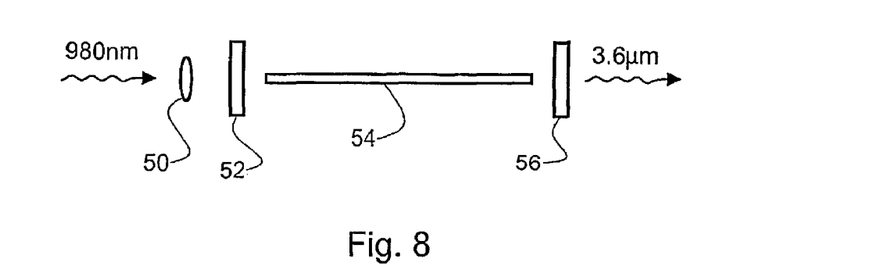
FIG. 8 shows an Er:doped GLS holey fibre laser.

FIG. 8 shows one example of an infrared fibre laser in the form of a laser having an erbium-doped GLS holey fibre gain medium 54 bounded by a cavity defined by a dichroic mirror 52 and output coupler 56. Pump radiation at 980 nm from a laser diode (not shown) is supplied to the cavity through a suitable lens 50. The laser produces a 3.6 micron laser output. It will be appreciated that other forms of cavity mirrors could be used, e.g. in-fibre Bragg grating reflectors.

(c) High-Power Cladding Pumped Laser: The higher index contrast possible in compound glass holey fibres allows for fibres with very high numerical aperture (NA) of well in excess of unity. It is therefore possible to provide improved pump confinement and thus tighter focusing, shorter devices, lower thresholds etc.

Figure 9:
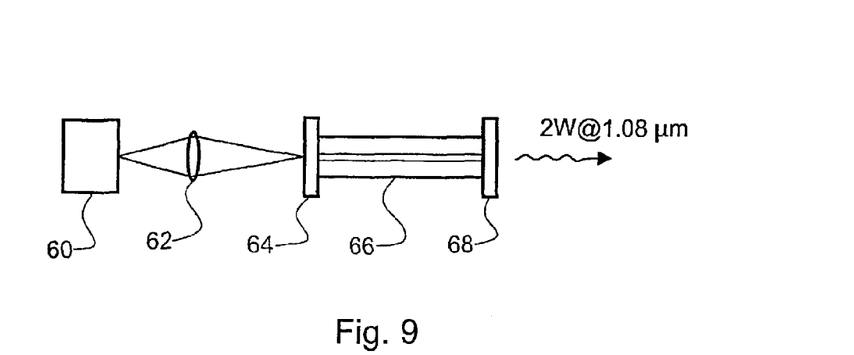
FIG. 9 shows a high power Nd:doped holey fibre laser.

FIG. 9 shows one example in the form of a cladding pumped laser having a GLS holey fibre gain medium 66 doped with Nd. A pump source is provided in the form of a high-power broad-stripe diode 60 of 10 W total output power at 815 nm. The pump source is coupled into the gain medium through a focusing lens 62 and the cavity is formed by a dichroic mirror 64 and output coupler 68 to provide high-power, multiwatt laser output at 1.08 microns.

Figure 10:
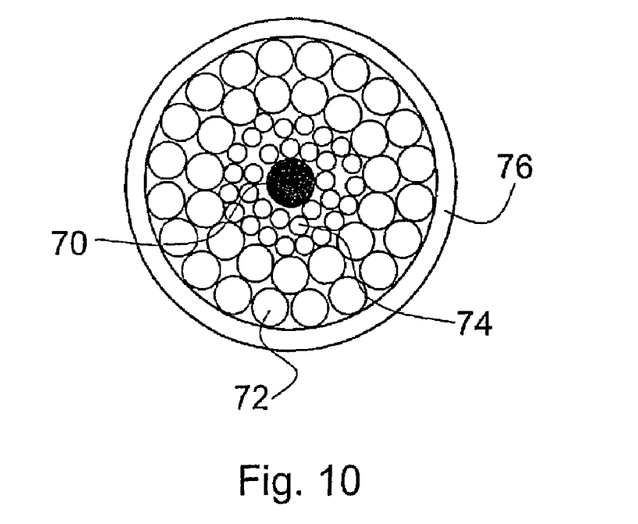
FIG. 10 is a cross-section through the holey fibre of FIG. 9.

FIG. 10 shows in cross-section one possible implementation of the Nd-doped GLS holey fibre of the laser of FIG. 9. A Nd-doped solid core 70 of diameter 'd' and radius 'r1' is surrounded by a first layer of holey cladding 74 extending to a radius 'r2' from the centre of the fibre and having holes of diameter 'd1'. This inner holey cladding layer is surrounded by a second outer cladding layer of holey fibre 72 of diameter 'd2' extending out to a radius 'r3' from the fibre centre axis. Finally, the entire bundle is encased by a low-index polymer coating 76. The polymer is advantageously doped with a dopant that exhibits absorption at a transmission wavelength of the compound glass fibre which it is desired to be stripped from the cladding. Graphite can be suitable for this purpose, as can transition metals such as Ti, V, Cr, Mn, Fe, Co, Ni or Cu, and rare earth ions such as Pr, Nd, Sm, Tb, Dy, Ho, Er, Tm or Yb. Typically, r1 is a few microns and r2 is about 100–200 microns in order to match the output of the pump diode.

Figure 11:
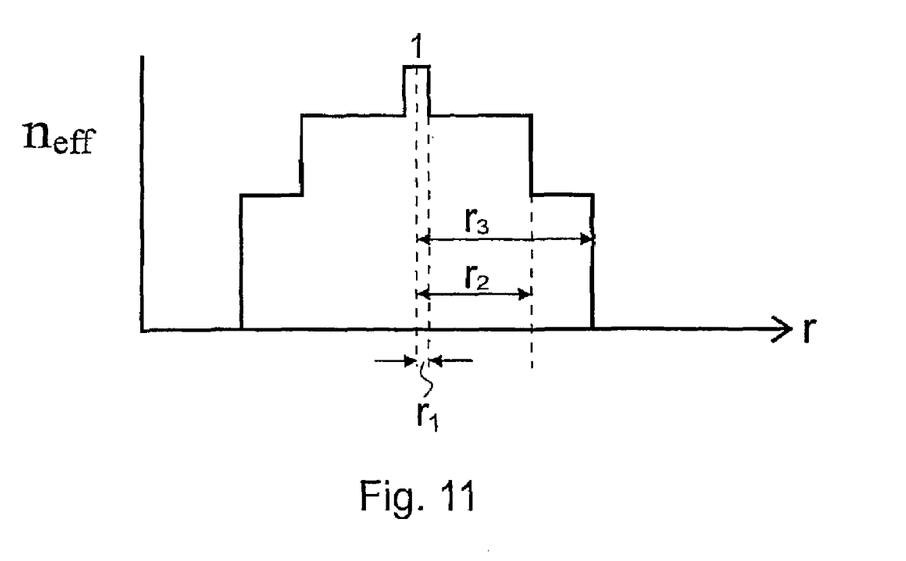
FIG. 11 is a graph showing the effective refractive index profile through the holey fibre of FIG. 10.

FIG. 11 shows the profile of effective refractive index across the fibre of FIG. 10. The profile reduces from a maximum at the solid core to a lower level in the inner small-hole cladding, to a still lower level in the outer large-hole cladding.

3. Non-linearity (a) Highly non-linear fibre for switching applications. When the higher third order refractive index constant $n_2$ typical of compound glass materials is combined with the high degree of mode confinement achievable with holey fibre, compound glass holey fibres could exhibit up to 10000 times the non-linearity of conventional silica fibre. Extremely short fibre based non-linear devices could thus be made for telecom power pulses.

Figure 12:
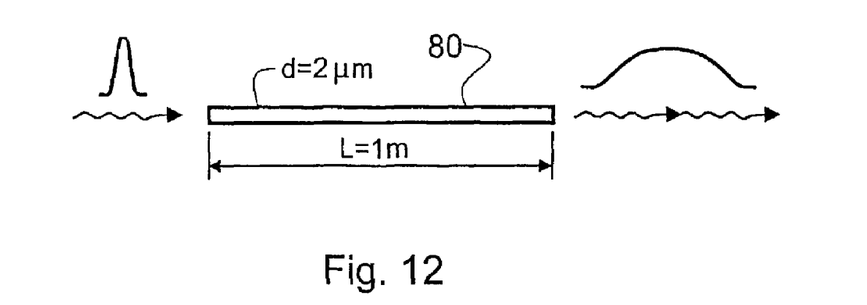
FIG. 12 shows a spectral broadening device based on a compound glass holey fibre.

FIG. 12 shows an example non-linear device used for spectral broadening of pulses. For example, consider a compound glass holey fibre 80 with a small core diameter of 2 microns, length 1 meter and $n_2$ of about 100 times that of silica. The propagation of an initially transform limited Gaussian pulse of approx. 1.7 W peak power in 1 m of fibre should result in a 10-fold spectral broadening, for example from 1 to 10 nm pulse half width. Alternatively, one can express the above example in terms of a maximal phase shift at the pulse centre i.e. a 1.7 W Gaussian pulse will generate a peak non-linear phase shift of 8.6 radians after propagation through 1 m of fibre. Note that both of the above calculations neglect the effect of fibre dispersion. Dispersion can play a significant role in the non-linear propagation of a short optical pulse and can for example result in effects such as soliton generation. Compound glass fibres offer for example the possibility of soliton formation at wavelengths not possible with conventional silica fibres.

A range of possibilities exist for using these fibres as the basis for a variety of non-linear optical switches. These include Kerr-gate based switches, Sagnac loop mirrors, non-linear amplifying loop mirrors or any other form of silica fibre based non-linear switches (see reference [5], the contents of which is incorporated herein by reference).

(b) Evanescent Field Devices: The guided mode can be made to have significant overlap with gas or liquid present in the holes, so that compound glass holey fibres can be used to measure gas concentrations, for example. A particular advantage of compound glass holey fibres is that longer wavelengths can be used, which would allow a much wider range of gases to be detected than with silica holey fibres. The mid-infrared (3–5 microns) part of the spectrum is of particular interest. As shown in FIG. 4(a), the cladding contains a number of approximately regularly spaced holes distributed across the fibre to define a pitch. In order to make an effective evanescent field device, we require that the wavelength of the light to be guided is at least approximately 2.2 times the pitch of the holes ($\Lambda$). The innermost ring of holes define a first group of holes which should have a characteristic hole size (d), in which case the ratio of hole size to pitch is preferably greater than or equal to approximately 0.6, more especially between approximately 0.6 and 0.8.

Working at these longer wavelengths should also significantly ease the fabrication requirements associated with making holey fibres that are suitable for evanescent field devices, simply because the size of the structure that is required scales with the wavelength.

Figure 13:
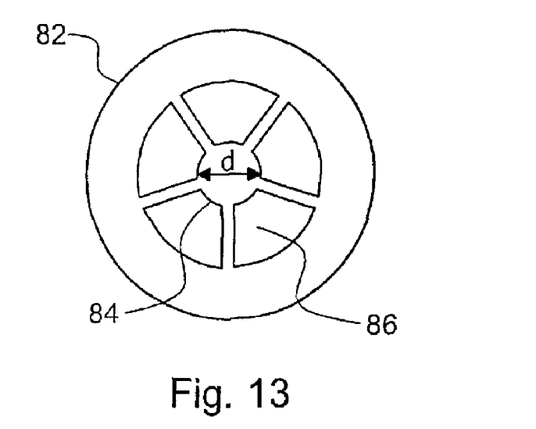
FIG. 13 is a cross-section through a compound glass holey fibre for gas sensing.

FIG. 13 shows a transverse section of a compound glass holey fibre for gas sensing. Large holes 86 in the cladding are provided by radially extending strut structures extending between a solid core 84 and outer casing 82. The core diameter 'd' is preferably much less than the operating wavelength '$\lambda$' to ensure that a significant fraction of the mode power lies in the holey region. For example, for 5 micron operation a core diameter of 2 microns could be used.

Figure 14:
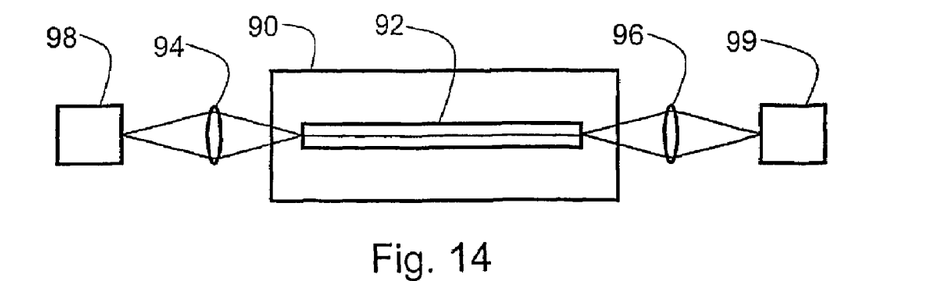
FIG. 14 is a gas sensor using the fibre of FIG. 13.

FIG. 14 shows a sensing device including a GLS holey fibre 92 having a structure as shown in FIG. 13. The GLS holey fibre is arranged in a gas container 90, containing $CO_2$ gas, for example. A light source 98 is arranged to couple light into the GLS holey fibre via a coupling lens 94 through a window in the gas container. Light is coupled out of the gas container through a further lens 96 and to a detector 99. The detector will register presence of a particular gas through an absorption measurement of the light (for example, absorption of light at 4.2 microns for the detection of $CO_2$).

4. Photosensitivity (a) Fibre gratings for Infrared: Making use of the photosensitivity of compound glass, gratings can be written using light at longer wavelengths than the conventional UV wavelengths used for writing gratings into silica fibre. The writing beam can be at 633 nm, for example. Techniques developed for writing gratings in silica glass can be adopted, such as stroboscopic phase mask methods [6], inteferometer methods [7] or proximity phase mask methods [8], the contents of these references being incorporated herein by reference. Fibre Bragg grating technology can thus be extended to the infrared/mid infrared. The high index contrast between modes of compound glass holey fibre structures also has the advantage of enhancing the separation and control of cladding modes.

Figure 15:
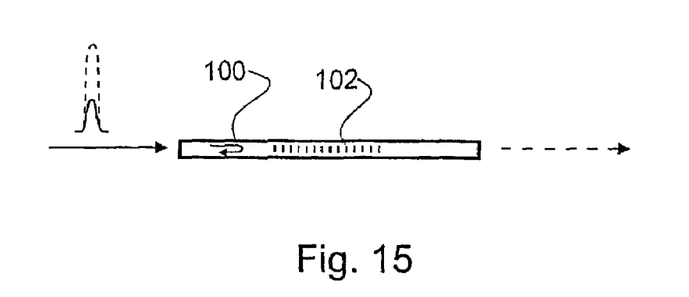
FIG. 15 is an optical switch based on a GLS holey fibre grating.

(b) Non-linear grating based devices: High non-linearity should allow for low threshold grating based devices (logic gates, pulse compressor and generators, switches etc.). For example, FIG. 15 shows an optical switch based on a GLS holey fibre 100 made with a small core diameter of around 1–2 microns and incorporating an optically written grating 102. In operation, pulses at low power (solid lines in the figure) are reflected from the grating, whereas higher power pulses (dashed lines in the figure) are transmitted due to detuning of the grating band gap through Kerr non-linearity.

5. Acoustic Devices

More efficient fibre acousto-optic (AO) devices can be fabricated. The acoustic figure of merit in compound glasses is expected to be as much as 100–1000 times that of silica. This opens the possibility of more efficient fibre AO devices such as AO-frequency shifters, switches etc. Passive stabilisation of pulsed lasers may also be provided. Microstructured fibres might also allow resonant enhancements for AO devices via matching of the scale of structural features to a fundamental/harmonic of the relevant acoustic modes. The use of compound glass materials would also allow AO devices to be extended to the infrared.

Figure 16:
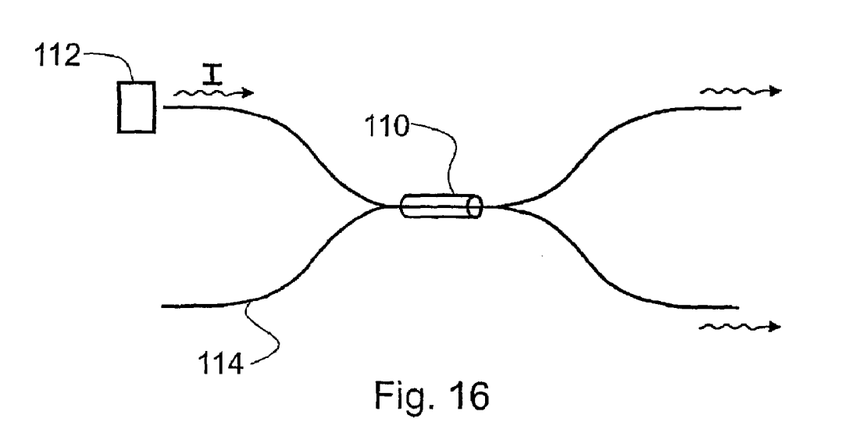
FIG. 16 is a further optical switch based on a null coupler made of GLS holey fibre.

FIG. 16 shows an AO device in the form of a null coupler based on GLS holey fibre. The device has the form of a null coupler 114 with a coupling region at which a piezoelectric transducer 110 is arranged for generating acoustic waves. In the absence of an acoustic wave, light I is coupled from a source 112 into one output arm of the coupler (solid line), whereas in the presence of the acoustic wave light is coupled into the other output of the coupler (dashed line). Further details of devices of this kind can be found in references [9] and [10].

6. Dispersion Effects

Compound glass holey fibres can provide engineerable dispersion in the infrared. In silica holey fibres, a range highly unusual dispersive properties are possible (such as solitons in the visible, dispersion compensation, dispersion flattening). In compound glass holey fibres, the dispersion could be tailored to allow a range of new possibilities in the infrared such as: solitons, efficient non-linear processes, parabolic pulse amplifiers etc.

Figure 17:
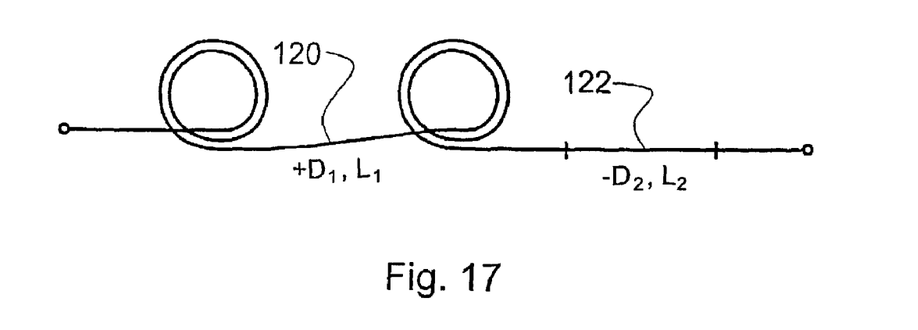
FIG. 17 shows an in-line dispersion compensator formed of a section of compound glass optical fibre with high negative dispersion.

FIG. 17 shows an example of a dispersion based device. A length $L_2$ of GLS holey fibre 122 arranged in series in a transmission line comprising a length $L_1$ of silica fibre 120, for in-line dispersion compensation. The GLS holey fibre has strong negative dispersion ($-D_2$) to compensate for the weak positive dispersion ($+D_1$) in the transmission fibre, either as pre- or post-compensation. Such dispersion compensation is appropriate also for use in short pulse fibre lasers operating in the infrared.

Figure 18:
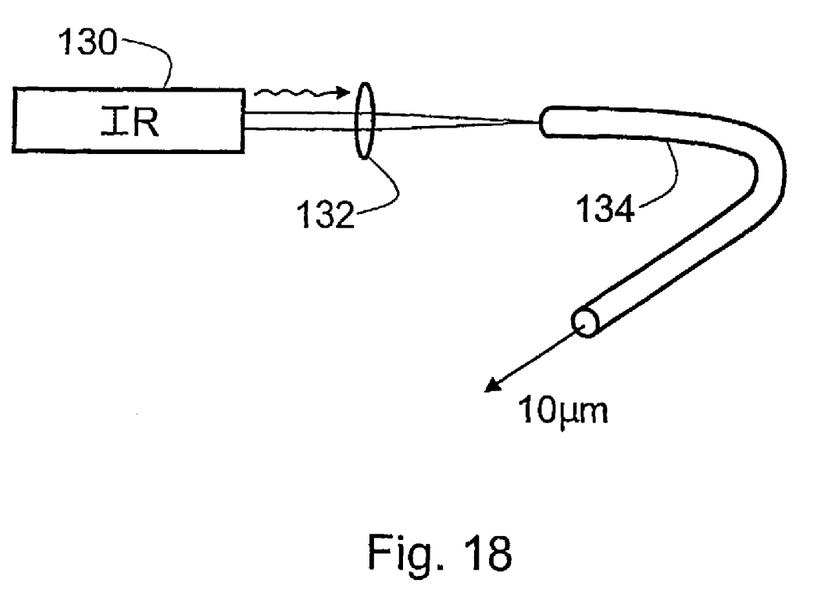
FIG. 18 shows a large core compound glass holey fibre used for power delivery of a high power infrared laser.

7. Mode-Size (a) High Power Handling Fibres for Infrared: Single mode compound glass holey fibres with large cores, e.g. ~0.5 mm, could find application in laser cutting, welding and machining. The hole spacing $\Lambda$ is preferably much greater than the wavelength $\lambda$ to be guided and the hole diameter d. In particular, $d/\Lambda$ is preferably less than about 0.2, or than 0.1. The holey structure also provides improved cooling opportunities for high power operation. FIG. 18 shows use of such a fibre 134 for guiding output from a $CO_2$ high power laser 130, also utilising a coupling lens 132 for coupling the laser light into the fibre.

REFERENCES

[1] Properties, Processing and Applications of Glass and Rare Earth-Doped Glasses for Optical Fibres, Parts B, C and D, ed. Dan Hewak, Published by IEE, Stevenage, United Kingdom (Inspec, the Institution of Electrical Engineers ISBN 0 85296 952x
[2] Y. D. West, T. Schweizer, D. J. Brady and D. W. Hewak, 'Gallium Lanthanum Sulphide Fibers for Infrared Transmission', Fiber and Integrated Optics, vol. 19, pages 29–250 (2000).
[3] U.S. Pat. No. 5,802,236: DiGiovanni et al
[4] Tanya M. Monro, D. J. Richardson, N. G. R. Broderick and P. J. Bennett, 'Holey fibres: an efficient modal model', J. Lightwave Technol. 17 (6), 1093–1102, 1999.
[5] G. Agrawal, Nonlinear Fiber Optics, Academic Press (1995)
[6] WO 98/08120
[7] U.S. Pat. No. 5,822,479
[8] EP-A-0843186
[9] T. A. Birks, S. G. Farwell, P. St. J. Russell & C. N. Pannell Four-Port Fibre Frequency-Shifter with a Null Taper Coupler Opt. Lett. Vol.19(23) pp. 1964–1966 December 1994
[10] S. H. Yun, D. J. Richardson, D. O. Culverhouse and T. A. Birks All-fibre acousto-optic filter with low polarization sensitivity and no frequency shift IEEE Phot. Tech. Lett. 1997 Vol. 9(4) pp. 461–453)

The invention claimed is:

1. A method of fabricating compound glass fibre, comprising:
   (a) making a holey preform of compound glass; and
   (b) drawing the preform in a drawing tower to produce a fibre,
   wherein the holey preform is made by stacking together a plurality of compound glass tubes, wherein the tubes are stacked within a larger tube which forms an outer jacket, and wherein the outer jacket is coated with a coating material prior to drawing with a material for stripping cladding modes and/or providing mechanical strength.

2. A method according to claim 1, wherein the coating material is graphite.

3. A method according to claim 1, wherein the coating material is a polymer doped with at least one of: graphite, a transition metal selected from the group Ti, V, Cr, Mn, Fe, Co, Ni and Cu; and a rare earth ion selected from the group Pr, Nd, Sm, Tb, Dy, Ho, Er, Tm and Yb.

4. A method according to claim 1, wherein the coating material is doped with a dopant that exhibits absorption at a transmission wavelength of the compound glass fibre which it is desired to be stripped from the cladding.

5. A method of fabricating compound glass fibre, comprising:
   (a) making a holey preform of compound glass; and
   (b) drawing the preform in a drawing tower to produce a fibre,
   wherein the holey preform is supported by a wiring structure retained for the drawing.

6. A compound glass fiber fabricated according to the method of claim 1.

7. A compound glass fiber fabricated according to the method of claim 5.

8. A method according to claim 1, wherein the drawing tower has a hot zone of at least 2 cm.

9. A method according to claim 5, wherein the drawing tower has a hot zone of at least 2 cm.

10. A method according to claim 1, wherein the drawing temperature is less than 1800° C.

11. A method according to claim 5, wherein the drawing temperature is less than 1800° C.

* * * * *